United States Patent
Tanaka et al.

(10) Patent No.: US 12,544,022 B2
(45) Date of Patent: Feb. 10, 2026

(54) PCCT APPARATUS AND CONTROL METHOD OF THE SAME

(71) Applicant: FUJIFILM Healthcare Corporation, Chiba (JP)

(72) Inventors: Ryo Tanaka, Kashiwa (JP); Masafumi Onouchi, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 181 days.

(21) Appl. No.: 18/482,017

(22) Filed: Oct. 6, 2023

(65) Prior Publication Data

US 2024/0130701 A1 Apr. 25, 2024
US 2024/0225574 A9 Jul. 11, 2024

(30) Foreign Application Priority Data

Oct. 19, 2022 (JP) .................................. 2022-167344

(51) Int. Cl.
*A61B 6/42* (2024.01)
*A61B 6/03* (2006.01)
*A61B 6/46* (2024.01)
*A61B 6/58* (2024.01)

(52) U.S. Cl.
CPC ............ *A61B 6/4241* (2013.01); *A61B 6/032* (2013.01); *A61B 6/461* (2013.01); *A61B 6/586* (2013.01)

(58) Field of Classification Search
CPC ......... A61B 6/032; A61B 6/461; A61B 6/586; A61B 6/4241
See application file for complete search history.

(56) References Cited

U.S. PATENT DOCUMENTS

| | | | | |
|---|---|---|---|---|
| 9,295,437 B2* | 3/2016 | Saito | ...... | A61B 6/035 |
| 2010/0020922 A1* | 1/2010 | Carmi | ...... | G01T 1/2985 378/19 |
| 2011/0235774 A1* | 9/2011 | Dolazza | ...... | A61B 6/502 378/22 |
| 2013/0223587 A1* | 8/2013 | Moriyasu | ...... | A61B 6/032 378/5 |
| 2014/0233693 A1* | 8/2014 | Wang | ...... | A61B 6/582 378/207 |
| 2015/0198725 A1* | 7/2015 | Tamura | ...... | G01T 1/17 378/5 |
| 2016/0095559 A1* | 4/2016 | Gagnon | ...... | A61B 6/482 600/425 |
| 2016/0324493 A1* | 11/2016 | Rodrigues | ...... | G01T 1/2985 |

(Continued)

FOREIGN PATENT DOCUMENTS

JP 2021146190 9/2021

*Primary Examiner* — Blake C Riddick
(74) *Attorney, Agent, or Firm* — JCIPRNET

(57) ABSTRACT

Provided are a PCCT apparatus and a control method of the same capable of detecting an abnormality occurring in a photon counting type detector.

There is provided a PCCT apparatus including a photon counting type detector that counts X-ray photons, the PCCT apparatus including: a spectrum generation unit that generates a spectrum which is a distribution of photon counts for each energy bin; a calculation unit that calculates a photon count change rate for each energy bin from a spectrum at a first time and a spectrum at a second time; and a determination unit that determines presence or absence of an abnormality in the photon counting type detector based on the photon count change rate.

10 Claims, 11 Drawing Sheets

(56) References Cited

U.S. PATENT DOCUMENTS

| | | | |
|---|---|---|---|
| 2018/0188391 A1* | 7/2018 | Daerr | A61B 6/4241 |
| 2018/0242927 A1* | 8/2018 | Nakai | G01T 1/2985 |
| 2019/0021685 A1* | 1/2019 | Kojima | A61B 6/4241 |
| 2019/0383954 A1* | 12/2019 | Onouchi | G01T 1/24 |
| 2020/0225368 A1* | 7/2020 | Onouchi | H01J 37/244 |
| 2020/0323502 A1* | 10/2020 | Kojima | A61B 6/025 |
| 2020/0330065 A1* | 10/2020 | Zhan | A61B 6/4035 |
| 2021/0290195 A1 | 9/2021 | Xiaohui et al. | |
| 2022/0000437 A1* | 1/2022 | Lai | A61B 6/4241 |
| 2022/0113189 A1* | 4/2022 | Moon | G01J 3/2889 |
| 2023/0293131 A1* | 9/2023 | Bindley | A61B 6/505 |
| | | | 378/54 |

* cited by examiner

PCCT APPARATUS AND CONTROL METHOD OF THE SAME

CLAIM OF PRIORITY

The present application claims priority from Japanese Patent Application JP 2022-167344 filed on Oct. 19, 2022, the content of which is hereby incorporated by reference into this application.

BACKGROUND OF THE INVENTION

1. Field of the Invention

The present invention relates to a photon counting computed tomography (PCCT) apparatus, and more particularly, to a technique for specifying an abnormality cause of a photon counting type detector provided in the PCCT apparatus.

2. Description of the Related Art

A photon counting computed tomography (PCCT) apparatus comprising a photon counting type detector, which is a detector that employs a photon counting method, can present a medical image including more information than a conventional CT apparatus. For example, it is possible to present an energy bin image, which is an image created using projection data divided into a plurality of energy bins, or a material decomposition image, which is an image in which a plurality of materials are decomposed. Since a temporal change of X-rays emitted to a subject may cause an artifact in the medical image presented by the PCCT apparatus, correction is necessary.

JP2021-146190A discloses that an anti-scatter grid that removes scattered radiation is provided and an amount of focal spot movement is calculated based on a count of X-ray photons detected by a reference detector disposed outside a scanning field of view.

SUMMARY OF THE INVENTION

However, JP2021-146190A does not take into consideration a case where an abnormality has occurred in the photon counting type detector. It is preferable to promptly detect the abnormality that has occurred in the photon counting type detector because the abnormality may cause an artifact in the medical image.

In that respect, an object of the present invention is to provide a PCCT apparatus and a control method of the same capable of detecting an abnormality occurring in a photon counting type detector.

In order to achieve the above object, according to an aspect of the present invention, there is provided a PCCT apparatus including a photon counting type detector that counts X-ray photons, the PCCT apparatus comprising: a spectrum generation unit configured to generate a spectrum that is a distribution of photon counts for each energy bin; a calculation unit configured to calculate a photon count change rate for each energy bin from a spectrum at a first time and a spectrum at a second time; and a determination unit configured to determine presence or absence of an abnormality in the photon counting type detector based on the photon count change rate.

In addition, according to another aspect of the present invention, there is provided a PCCT apparatus including a photon counting type detector that counts X-ray photons, the PCCT apparatus comprising: a spectrum generation unit configured to generate a spectrum that is a distribution of photon counts for each energy bin; a calculation unit configured to calculate a difference between a spectrum obtained by a first detection element and a spectrum obtained by a second detection element; and a determination unit configured to determine presence or absence of an abnormality in the photon counting type detector based on the difference.

Further, according to still another aspect of the present invention, there is provided a control method of a PCCT apparatus including a photon counting type detector that counts X-ray photons, the control method comprising: a spectrum generation step of generating a spectrum that is a distribution of photon counts for each energy bin; a calculation step of calculating a photon count change rate for each energy bin from a spectrum at a first time and a spectrum at a second time; and a determination step of determining presence or absence of an abnormality in the photon counting type detector based on the photon count change rate.

According to the aspects of the present invention, it is possible to provide a PCCT apparatus and a control method of the same capable of detecting an abnormality occurring in a photon counting type detector.

DESCRIPTION OF THE PREFERRED EMBODIMENTS

Figure 1:
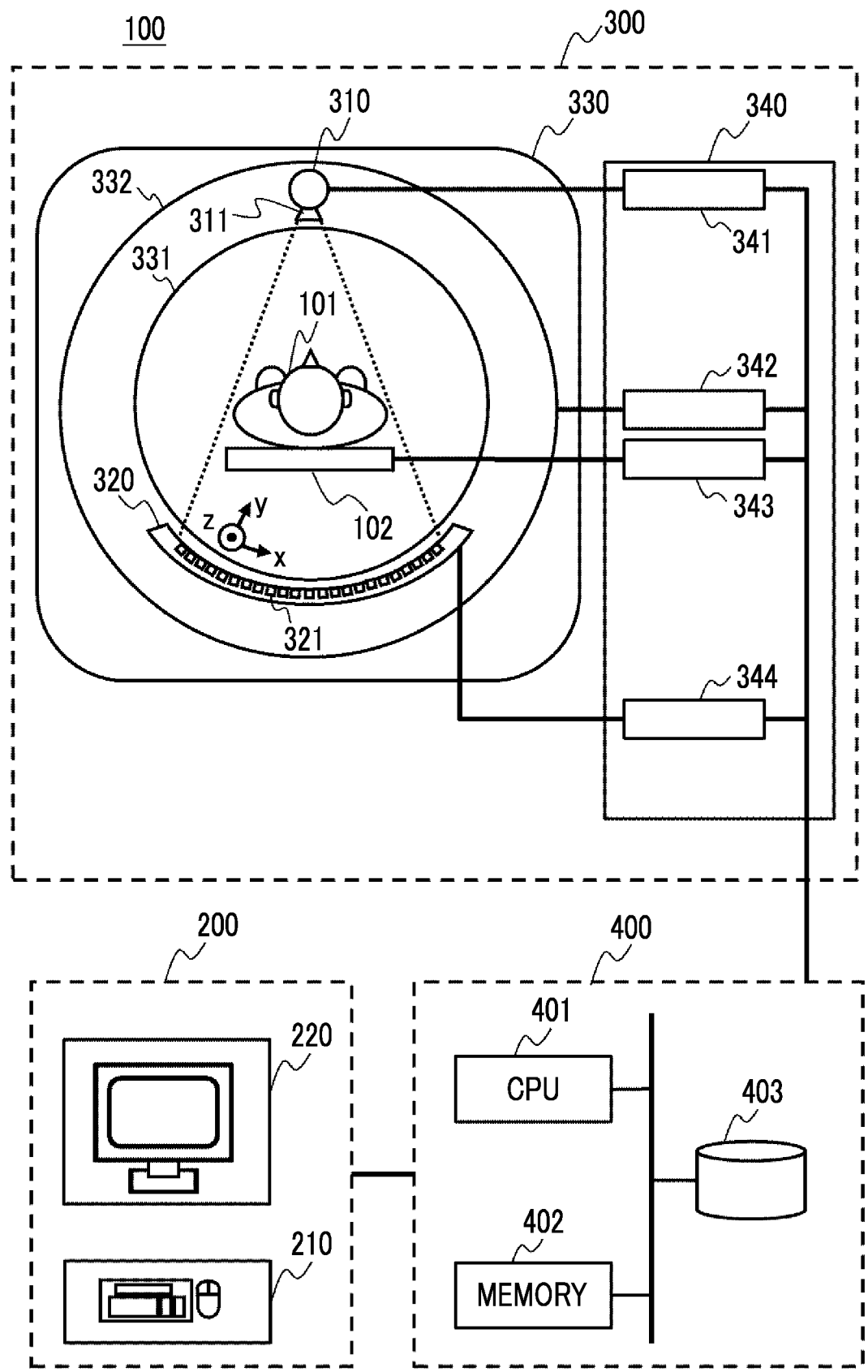
FIG. 1 is a diagram showing an overall configuration of a PCCT apparatus.

Hereinafter, examples of a photon counting computed tomography (PCCT) apparatus according to the present invention will be described with reference to the accompanying drawings. In the following description and the accompanying drawings, components having the same functional configuration are designated by the same reference numerals, and duplicate description thereof will not be repeated.

EXAMPLE 1

An overall configuration of a PCCT apparatus 100 will be described with reference to FIG. 1. The PCCT apparatus 100 comprises an input and output unit 200, an imaging unit 300, and a general controller 400.

The input and output unit 200 includes an input device 210 and a monitor 220. The input device 210 is a device that is used in a case where an operator inputs imaging conditions and the like, and is, for example, a mouse or a keyboard. The monitor 220 is a display device that outputs the input imaging conditions and the like, and is also used as the input device 210 in a case where a touch panel function is provided.

The imaging unit 300 comprises an X-ray source 310, an X-ray detector 320, a gantry 330, a table 102, and an imaging controller 340 in order to acquire projection data of a subject 101 at various projection angles. The acquired projection data is divided into a plurality of energy bins.

The X-ray source 310 is a device that irradiates the subject 101 with X-rays. A collimator 311 is provided between the X-ray source 310 and the subject 101. The collimator 311 is a device that adjusts an irradiation field of X-rays emitted to the subject 101.

The X-ray detector 320 is a device that detects X-rays and includes a plurality of detection elements 321. The detection elements 321 are a photon counting type detector in which a semiconductor element, such as CdTe, and a counting circuit element are connected, and approximately 1000 detection elements are disposed at an equal distance from an X-ray focal spot of the X-ray source 310, for example, at a distance of 1000 mm. In the detection element 321, the X-ray photons incident on one element are counted for each energy bin.

Figure 2:
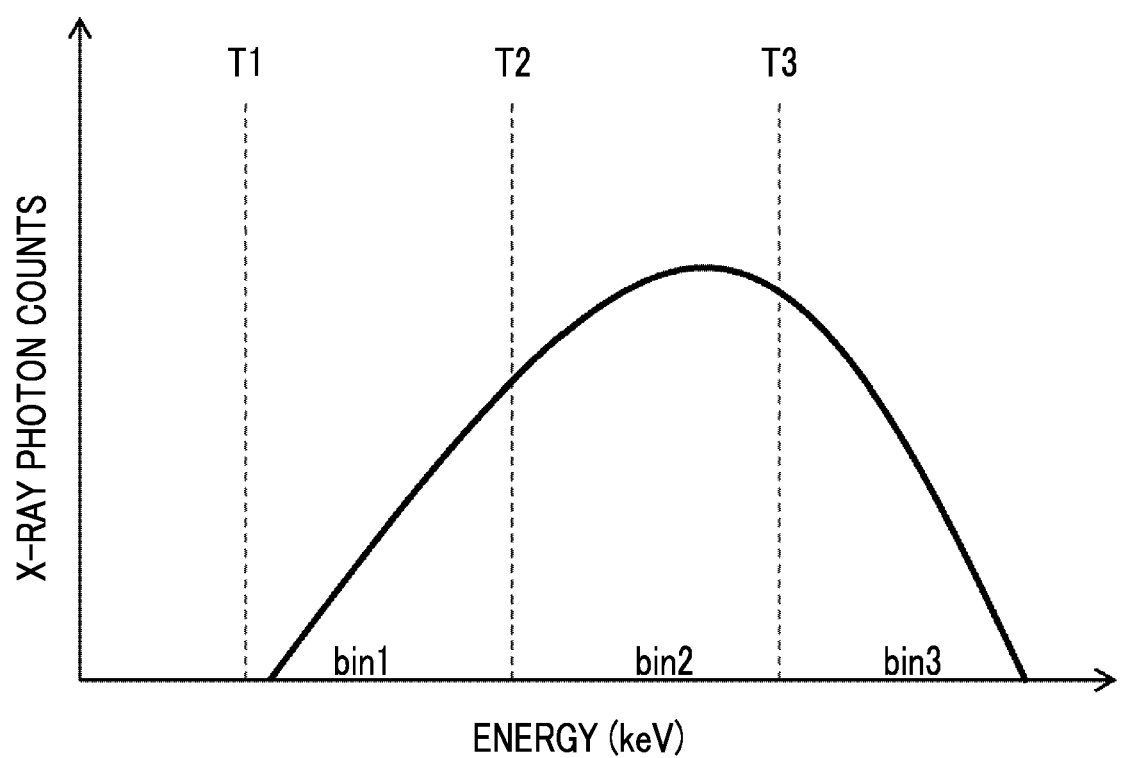
FIG. 2 is a diagram showing an example of X-ray photons counted for each energy bin.

The X-ray photons counted for each energy bin will be described with reference to FIG. 2. The X-ray photons incident on the detection element 321 are divided into a plurality of energy bins based on an energy threshold value set in advance. FIG. 2 shows three energy bins bin1, bin2, and bin3 divided by energy threshold values T1, T2, and T3. That is, X-ray photons with energies from T1 to T2 in bin1, X-ray photons with energies from T2 to T3 in bin2, and X-ray photons with energies greater than T3 in bin3 are each counted. Then, by counting the X-ray photons for each energy bin, a spectrum which is a distribution of photon counts for each energy bin is generated.

Return to the description of FIG. 1. A circular opening portion 331 for disposing the table 102 on which the subject 101 is placed is provided in the center of the gantry 330. A diameter of the opening portion 331 is, for example, 700 mm. The gantry 330 includes an X-ray source 310 and an X-ray detector 320 that are mounted therein, and is provided with a rotating plate 332 that rotates the X-ray source 310 and the X-ray detector 320 around the subject 101. The table 102 moves in a z direction in order to adjust a position of the subject 101 with respect to the gantry 330.

The imaging controller 340 includes an X-ray controller 341, a gantry controller 342, a table controller 343, and a detector controller 344. The X-ray controller 341 controls a voltage or the like to be applied to the X-ray source 310. The gantry controller 342 controls the rotation of the rotating plate 332 and rotates the rotating plate 332 once in, for example, 1.0 s. The detector controller 344 controls the detection of X-rays by the X-ray detector 320 and causes the X-ray detector 320 to detect X-rays, for example, each time the rotating plate 332 rotates by 0.4 degrees. The table controller 343 controls the movement of the table 102.

The general controller 400 includes a central processing unit (CPU) 401, a memory 402, and a storage device 403, and controls the imaging controller 340 and performs various types of processing on the projection data or the like of X-rays detected by the X-ray detector 320. For example, the general controller 400 executes processing of reconstructing a tomographic image from projection data acquired in accordance with imaging conditions set through the input device 210. The tomographic image may be reconstructed for each energy bin. In addition, the reconstructed tomographic image and the projection data used in the reconstruction processing may be displayed on the monitor 220 or stored in the storage device 403, and may be handled for each energy bin.

In a case where the detection element 321 provided in the X-ray detector 320 has an abnormality, a temporal change occurs in the spectrum generated by counting X-ray photons, and an artifact may occur in the tomographic image. In that respect, in Example 1, the abnormality occurring in the detection element 321 is detected based on a photon count change rate for each energy bin calculated from a spectrum at a first time and a spectrum at a second time.

There are various types of abnormalities occurring in the detection element 321, such as polarization, a decrease in gain, a decrease in energy resolution, a shift in energy threshold value, a decrease in sensitivity, an increase in noise in a local energy region, and a signal output malfunction. In addition, temporal change patterns of the spectrum vary depending on the types of abnormalities occurring in the detection element 321. Therefore, each type will be described below.

Figure 3A:
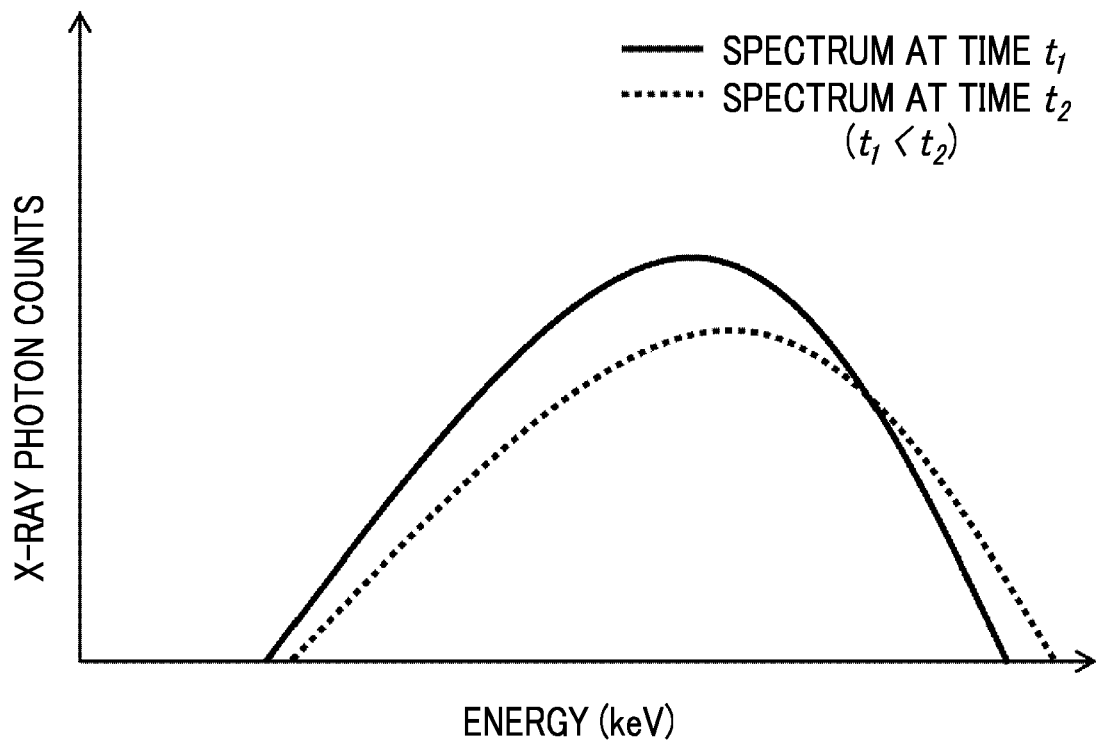
FIG. 3A is a diagram showing a temporal change in a spectrum in a case where polarization has occurred.
Figure 3B:
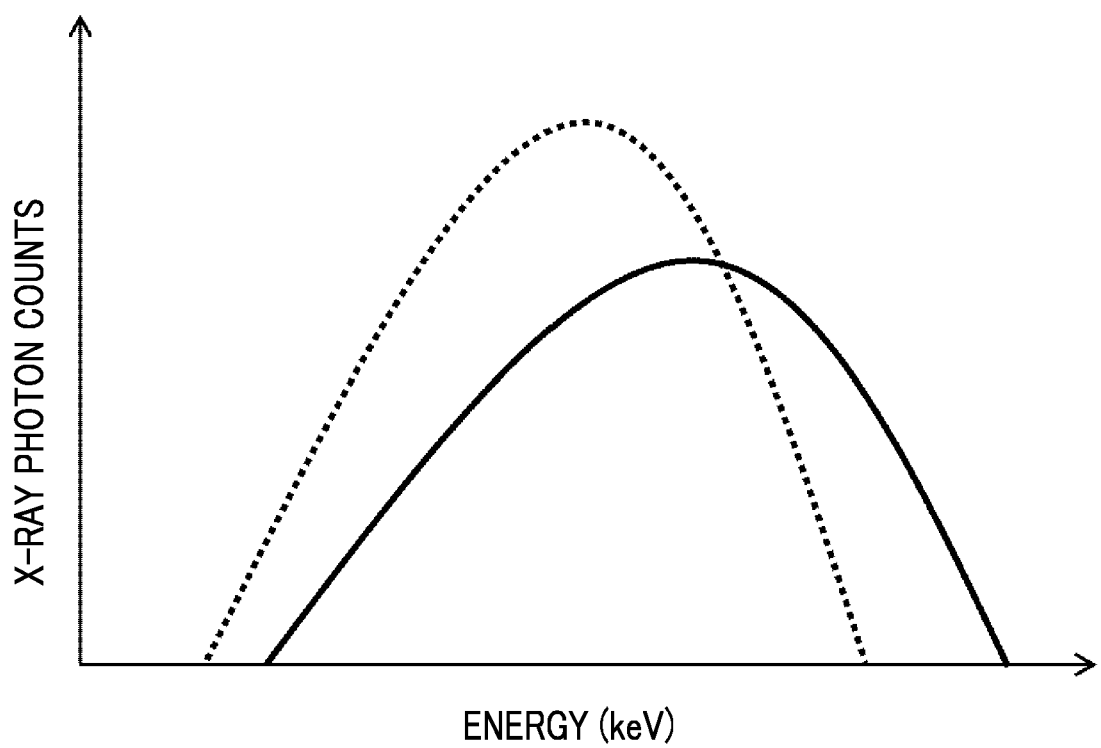
FIG. 3B is a diagram showing a temporal change in a spectrum in a case where polarization has occurred.

The temporal change patterns of the spectra in a case where polarization has occurred will be described with reference to FIGS. 3A and 3B. Polarization is a phenomenon that occurs in a case where a charge generated by the X-ray incidence is trapped or released by a lattice defect included in the semiconductor element, and causes changes in the spectrum as shown in FIGS. 3A and 3B. FIG. 3A shows an example of a case where the spectrum shifts in a positive direction of the energy and shifts in a negative direction of the X-ray photon counts. FIG. 3B shows an example of a case where the spectrum shifts in a negative direction of the energy and shifts in a positive direction of the X-ray photon counts. In addition, the spectra before and after the change have one intersection point. The polarization is resolved by resetting the voltage to be applied to the semiconductor element.

Figure 4:
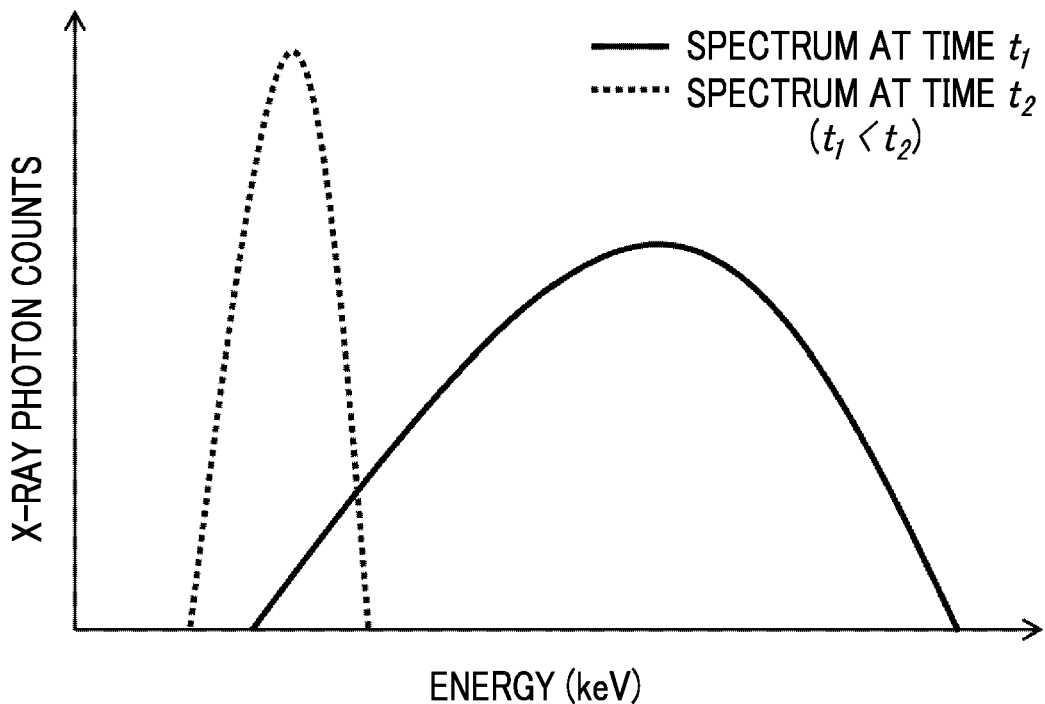
FIG. 4 is a diagram showing a temporal change in a spectrum in a case where a decrease in gain has occurred.

The temporal change pattern of the spectrum in a case where a decrease in gain has occurred will be described with reference to FIG. 4. The decrease in gain occurs due to a breakage of the semiconductor element or a partial disconnection between the semiconductor element and the counting circuit element, and causes changes in the spectrum as shown in FIG. 4. That is, in a case where the decrease in gain occurs, the spectrum shifts in the negative direction of the energy and shifts in the positive direction of the X-ray photon counts. In addition, the spectra before and after the change have one intersection point. The shift directions of the spectrum are the same as those in FIG. 3B, but a shift amount is significantly larger than that in FIG. 3B. In addition, an energy region where the X-ray photon counts are zero is half or more of the original energy region.

Figure 5:
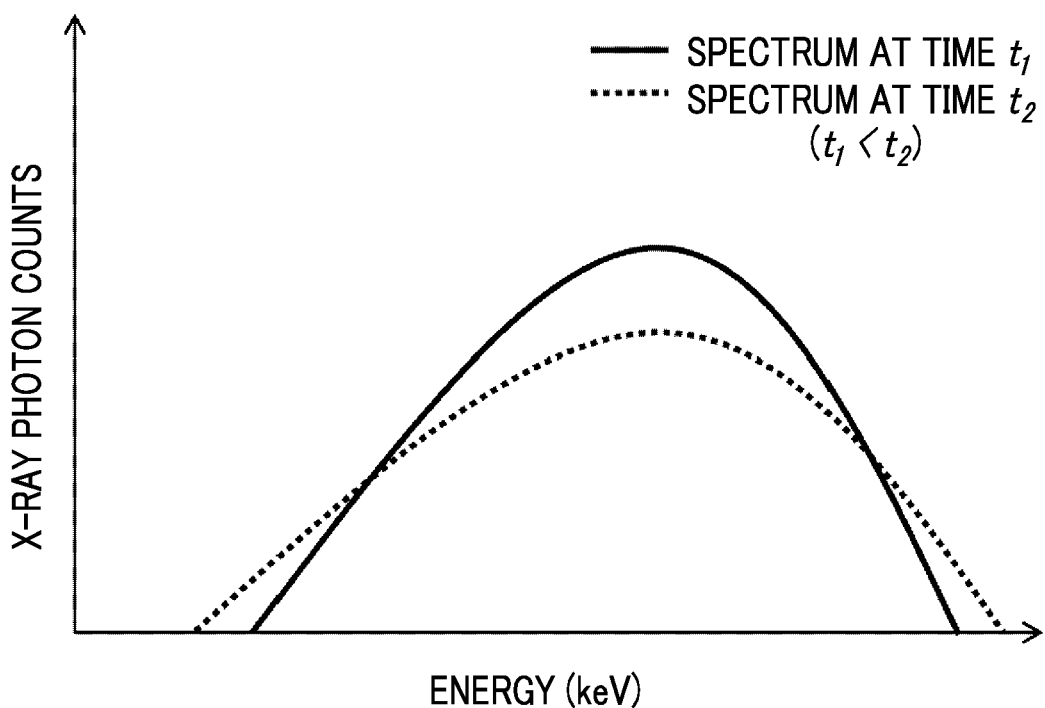
FIG. 5 is a diagram showing a temporal change in a spectrum in a case where a decrease in energy resolution has occurred.

The temporal change pattern of the spectrum in a case where a decrease in energy resolution has occurred will be described with reference to FIG. 5. The decrease in energy resolution occurs due to the degradation of the semiconductor element or the mixing of noise into the counting circuit element, and causes changes in the spectrum as shown in FIG. 5. That is, in a case where the decrease in energy resolution occurs, the spectrum expands in the positive and negative directions of the energy and shifts in the negative direction of the X-ray photon counts. In addition, the spectra before and after the change have two intersection points.

Figure 6:
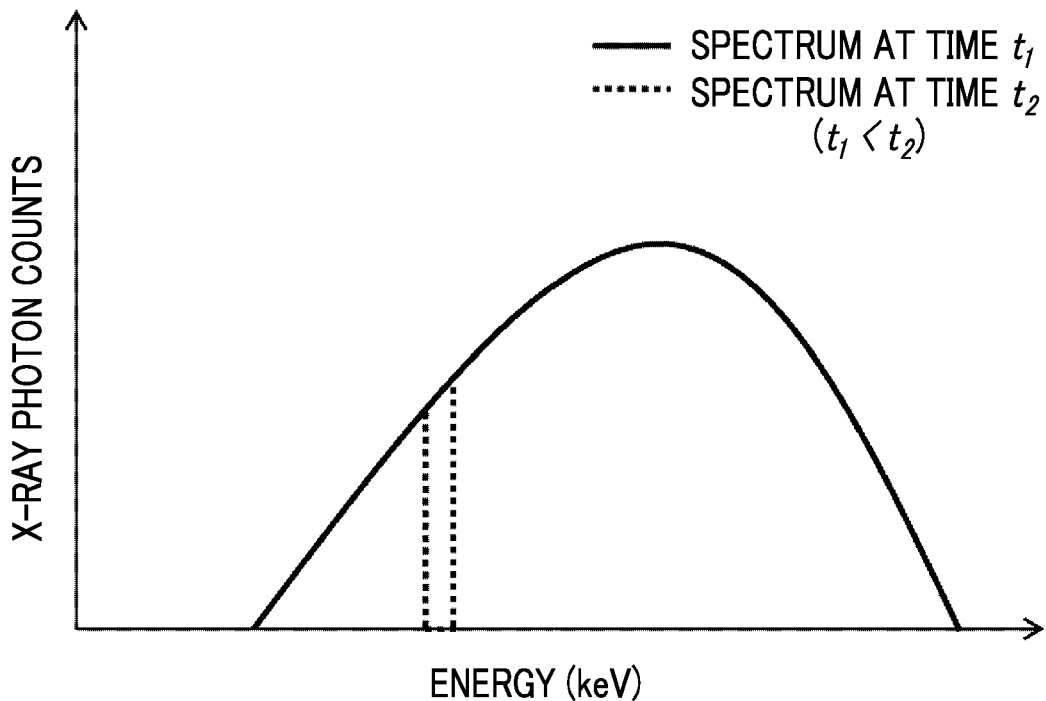
FIG. 6 is a diagram showing a temporal change in a spectrum in a case where a shift in energy threshold value has occurred.

The temporal change pattern of the spectrum in a case where an abnormality has occurred in the energy threshold value or a counter will be described with reference to FIG. 6. In a case where the abnormality occurs in the energy threshold value or the counter, the X-ray photon counts decrease discontinuously in a part of the energy bin of the spectrum as shown in FIG. 6.

Figure 7:
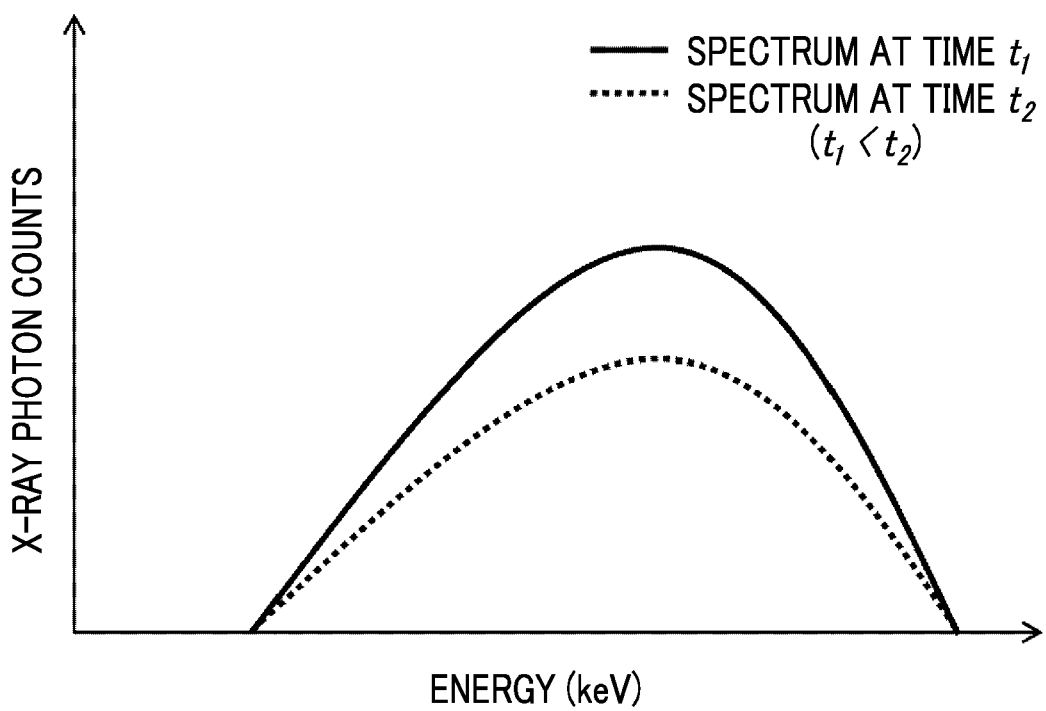
FIG. 7 is a diagram showing a temporal change in a spectrum in a case where a decrease in sensitivity has occurred.

The temporal change pattern of the spectrum in a case where a decrease in sensitivity has occurred will be described with reference to FIG. 7. The decrease in sensitivity occurs due to the failure or degradation of the semiconductor element or a complete disconnection between the semiconductor element and the counting circuit element, and causes changes in the spectrum as shown in FIG. 7. That is, in a case where the decrease in sensitivity occurs, the spectrum shifts in the negative direction of the X-ray photon counts. In addition, the spectra before and after the change have no intersection point.

Figure 8:
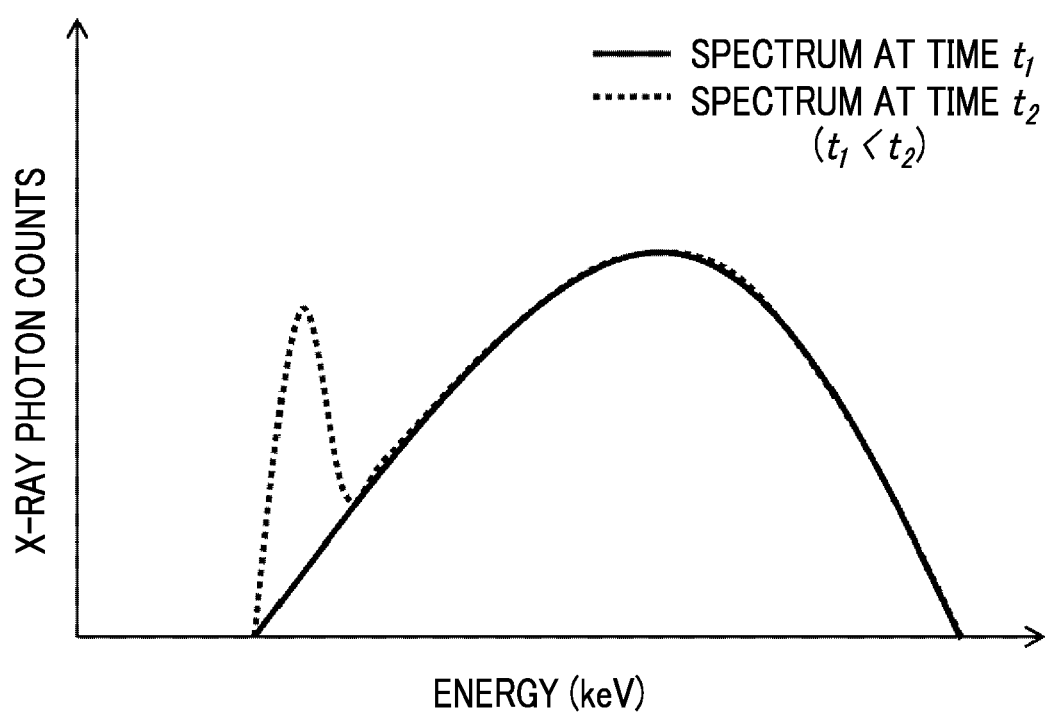
FIG. 8 is a diagram showing a temporal change in a spectrum in a case where an increase in noise has occurred in a local energy region.

The temporal change pattern of the spectrum in a case where an increase in noise has occurred in a local energy region will be described with reference to FIG. 8. The increase in noise in the local energy region occurs due to the failure or degradation of the semiconductor element or the counting circuit element, and causes changes in the spectrum as shown in FIG. 8. That is, in a case where the increase in noise occurs in the local energy region, the peak caused by the noise occurs in a part of the energy bin of the spectrum.

An example of a flow of processing of Example 1 will be described step by step with reference to FIG. 9.

S901

The general controller 400 controls the imaging controller 340 to count the X-ray photons for each energy bin in all the detection elements 321. By counting the X-ray photons for each energy bin, a spectrum which is a distribution of the photon counts for each energy bin is generated. It is desirable that the counting of X-ray photons in S901 is performed in a state in which the subject 101 is not present.

In a case where the X-ray photons are counted in a state in which the subject 101 is present, the detection elements 321 disposed in an air region measurement portion 1000 shown as an example in FIG. 10A-10D are targets in the subsequent processing. Since the size of the air region measurement portion 1000 varies depending on the size of the subject 101 and the projection angle, the air region measurement portion 1000 may be set in advance based on a scanogram image.

S902

The general controller 400 uses the X-ray photon counts obtained in S901 to calculate the photon count change rates for each energy bin in all the detection elements 321. A photon count change rate R (ch, E, t) is calculated using, for example, Equation 1.

$$R(ch,E,t)=1-C(ch,E,t)/C(ch,E,t0) \qquad \text{(Equation 1)}$$

Here, ch denotes a channel number of the detection element 321, E denotes the energy bin, t denotes the counting time, and C (ch, E, t) denotes the X-ray photon counts counted at the channel number ch, the energy bin E, and the counting time t. C (ch, E, t0) denotes the X-ray photon counts counted in a state in which the subject 101 is not present at the channel number ch, the energy bin E, and the counting time t0 (<C (ch, E, t0) counted in advance is stored in the storage device 403 and is read out from the storage device 403 in a case where the photon count change rate R (ch, E, t) is calculated.

S903

The general controller 400 determines whether or not all the photon count change rates at a certain counting time t calculated in S902 are within an allowable range. In a case where all the photon count change rates are within the allowable range, the process proceeds to S904. That is, determination is made that there is no abnormality in the detection elements 321. In addition, in a case where at least one of all the photon count change rates is outside the allowable range, the process proceeds to S905.

An upper limit value R U and a lower limit value R L indicating the allowable range of the photon count change rate are set in advance for each channel number and for each energy bin and are stored in the storage device 403. For example, the shorter the distance from the center of the X-ray detector 320 to the detection element 321 in the rotation direction of the rotating plate 332 is, the narrower the allowable range is set. By setting a narrower allowable range for the detection element 321 closer to the center of the X-ray detector 320, it is possible to more precisely determine the presence or absence of an abnormality in the detection element 321 which is more important in the reconstruction of the tomographic image. Alternatively, the same allowable range may be used for all the detection elements 321. By using the same allowable range, the storage capacity of the storage device 403 can be saved. The allowable range may be set for each tube current or for each tube voltage of the X-ray source 310.

S904

The general controller 400 causes the monitor 220 to display that there is no abnormality in the detection elements 321 and the X-ray source 310.

S905

The general controller 400 determines whether or not the photon count change rates calculated in S902 are outside the allowable range in all the detection elements 321 and whether or not the temporal change patterns of the spectra are all the same. In a case where the photon count change rates are outside the allowable range in all the detection elements 321 and the patterns are all the same, the process proceeds to S906. That is, determination is made that there is an abnormality in the X-ray source 310 but there is no abnormality in the detection elements 321. Further, in a case where at least one of all the photon count change rates is within the allowable range or the photon count change rates outside the allowable range include different patterns, the process proceeds to S907.

S906

The general controller 400 causes the monitor 220 to display that there is no abnormality in the detection elements 321 but there is an abnormality in the X-ray source 310.

S907

The general controller 400 determines whether or not the photon count change rate, which is determined in S903 to be outside the allowable range, includes the pattern of the polarization. In a case where the photon count change rate outside the allowable range includes the pattern of polarization, the process proceeds to S908. That is, determination is made that the polarization has occurred in the detection element 321. Further, in a case where the photon count change rate outside the allowable range does not include the pattern of the polarization, the process proceeds to S909.

Determination that the pattern of the photon count change rate determined to be outside the allowable range is polarization is made in a case where the following three conditions are satisfied. A first condition is that the photon count change rate outside the allowable range does not remain within a part of the energy region. For example, in a case where the X-ray photons are divided into three energy bins, the first condition is satisfied in a case where the photon count change rates are outside the allowable range in two or more energy bins, and FIGS. 3A, 3B, 4, 5, and 7 correspond to this case. A second condition is that the spectra before and after the change have one intersection point, which is satisfied in FIGS. 3A, 3B, and 4. A third condition is that the energy region where the X-ray photon counts are zero in the spectrum after the change is less than half of the energy region before the change. For example, in a case where the X-ray photons are divided into three energy bins, the third condition is satisfied in a case where there are one or fewer energy bins in which the X-ray photon counts are zero, and FIGS. 3A, 3B, 5, 6, 7, and 8 correspond to this case. That is, the three conditions are satisfied in FIGS. 3A and 3B.

S908

Figure 11:
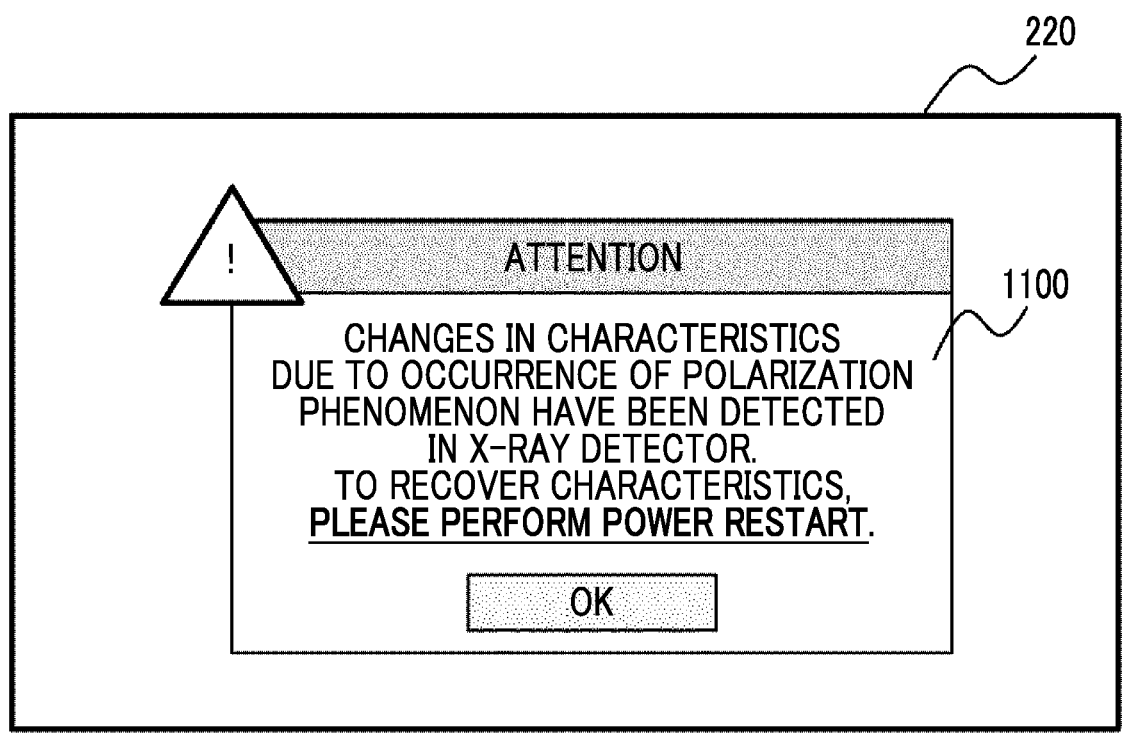
FIG. 11 is a diagram showing an example of a screen in a case where polarization is detected.

The general controller 400 issues notification that the polarization has occurred in the detection element 321, and causes the monitor 220 to display a screen for issuing an instruction of a power restart. FIG. 11 shows an example of a notification/instruction screen 1100 displayed on the monitor 220 in S908. The screen displayed on the monitor 220 is not limited to the notification/instruction screen 1100 shown as an example in FIG. 11.

S909

The general controller 400 estimates an abnormality cause other than the polarization based on the pattern of the photon count change rate determined in S903 to be outside the allowable range.

An example of a flow of processing of estimating the abnormality cause in S909 will be described step by step with reference to FIG. 12.

S1201

The general controller 400 determines whether or not the photon count change rate, which is determined in S903 to be outside the allowable range, is within a part of the energy region. In a case where the photon count change rate outside the allowable range is within a part of the energy region, the process proceeds to S1202. Specifically, FIGS. 6 and 8 correspond to this case. Further, in a case where the photon count change rate outside the allowable range does not remain within a part of the energy bin, the process proceeds to S1205. Specifically, FIGS. 4, 5, and 7 correspond to this case.

S1202

The general controller 400 determines whether or not the photon count change rate, which is determined in S903 to be outside the allowable range, is positive. In a case where the photon count change rate is positive, the process proceeds to S1203. Specifically, FIG. 8 corresponds to this case. Further, in a case where the photon count change rate is not positive, the process proceeds to S1204. Specifically, FIG. 6 corresponds to this case.

S1203

The general controller 400 causes the monitor 220 to display that an increase in noise has occurred in the local energy region of the detection element 321.

S1204

The general controller 400 causes the monitor 220 to display that an abnormality has occurred in the energy threshold value or the counter of the detection element 321.

S1205

The general controller 400 determines whether or not there are two or more intersection points in the spectra before and after the change. In a case where there are two or more intersection points, the process proceeds to S1206. Specifically, FIG. 5 corresponds to this case. Further, in a case where there are fewer than two intersection points, the process proceeds to S1207. Specifically, FIGS. 4 and 7 correspond to this case.

S1206

The general controller 400 causes the monitor 220 to display that a decrease in energy resolution has occurred in the detection element 321.

S1207

The general controller 400 determines whether or not the energy region where the X-ray photon counts are zero in the spectrum after the change is less than a threshold value. In a case where the energy region where the X-ray photon counts are zero is less than the threshold value, the process proceeds to S1208. Specifically, FIG. 7 corresponds to this case. Further, in a case where the energy region where the X-ray photon counts are zero is equal to or greater than the threshold value, the process proceeds to S1209. Specifically, FIG. 4 corresponds to this case. For example, half of the energy region in the spectrum before the change is set as the threshold value.

S1208

The general controller 400 causes the monitor 220 to display that a decrease in sensitivity has occurred in the detection element 321.

S1209

The general controller 400 causes the monitor 220 to display that a decrease in gain has occurred in the detection element 321.

Figure 12:
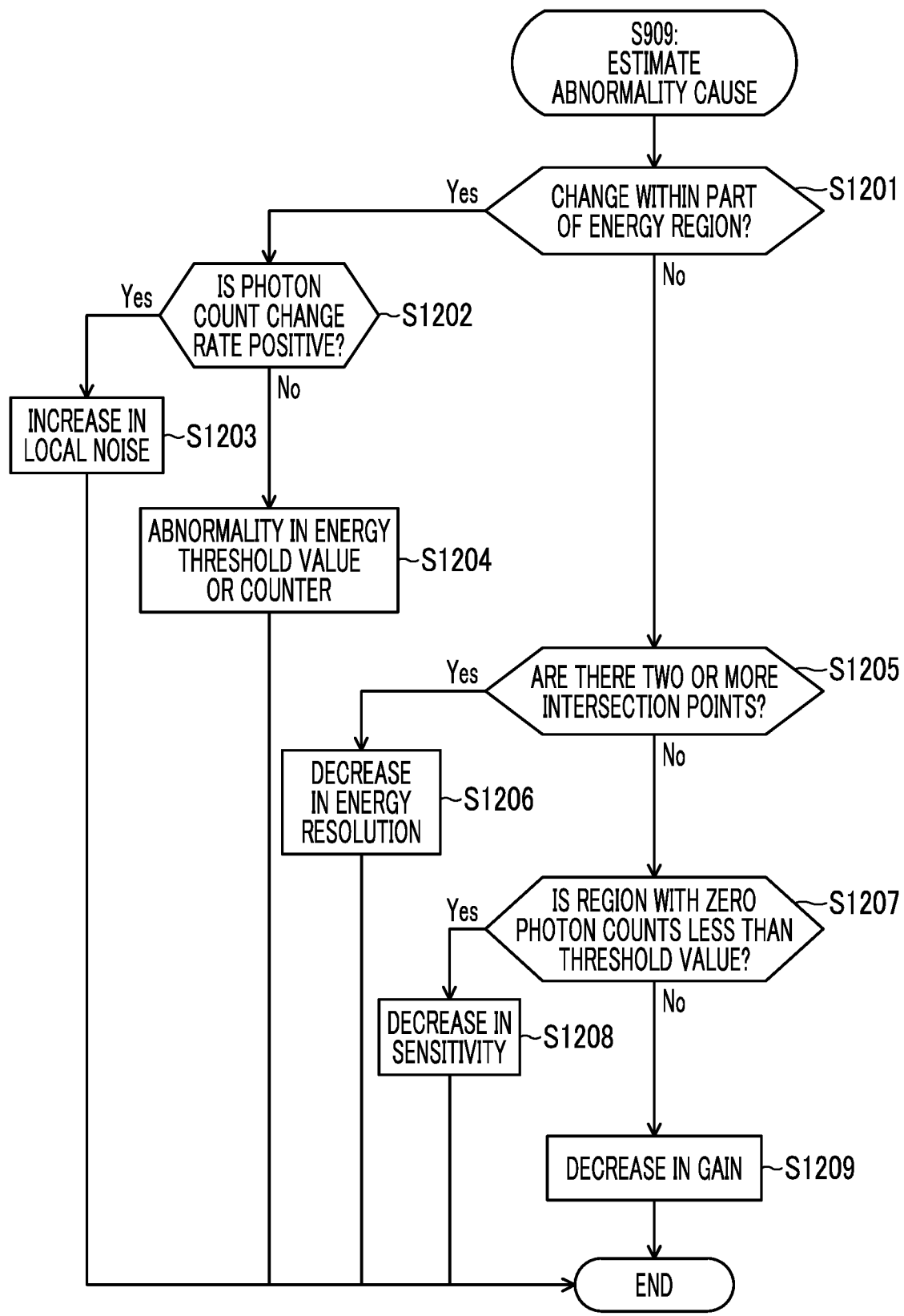
FIG. 12 is a diagram showing an example of a flow of processing of estimating an abnormality other than polarization.

By the flow of the processing shown as an example in FIG. 12, an abnormality cause other than the polarization is estimated. Return to the description of FIG. 9.

S910

The general controller 400 determines whether or not the number of detection elements 321, whose photon count change rates are determined in S903 to be outside the allowable range, is equal to or less than a threshold value. In a case where the number of detection elements 321 outside the allowable range is equal to or less than the threshold value, the process proceeds to S911. Further, in a case where the number of channels outside the allowable range exceeds the threshold value, the process proceeds to S912. The number of channels that can interpolate the output of a defective channel without causing artifacts is set in advance as the threshold value.

S911

The general controller 400 causes the monitor 220 to display a screen for issuing an instruction to register the detection element 321, whose photon count change rate is determined to be outside the allowable range, as the defective channel. The output of the detection element 321 registered as the defective channel is interpolated by the output of the surrounding detection element 321.

S912

The general controller 400 causes the monitor 220 to display a screen for issuing an instruction to notify the service engineer that an abnormality has occurred in the detection element 321. The service engineer who is notified that the abnormality has occurred in the detection element 321 can perform repairs or replacements of the X-ray detector 320. The service engineer who performs repairs or replacements of the X-ray detector 320 may refer to the abnormality cause estimated in S909.

Figure 9:
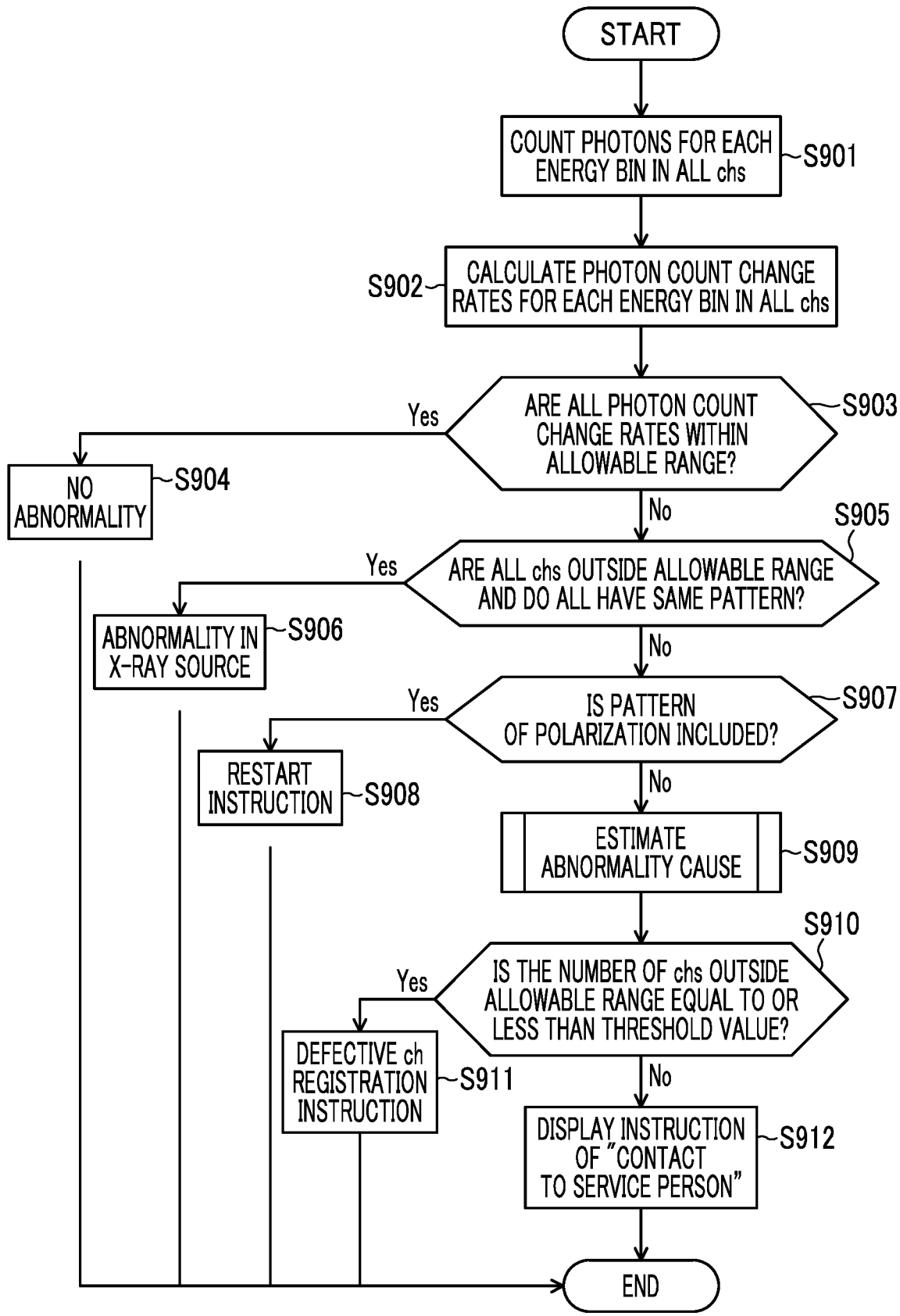
FIG. 9 is a diagram showing an example of a flow of processing of detecting an abnormality in a photon counting type detector.
Figure 10A:
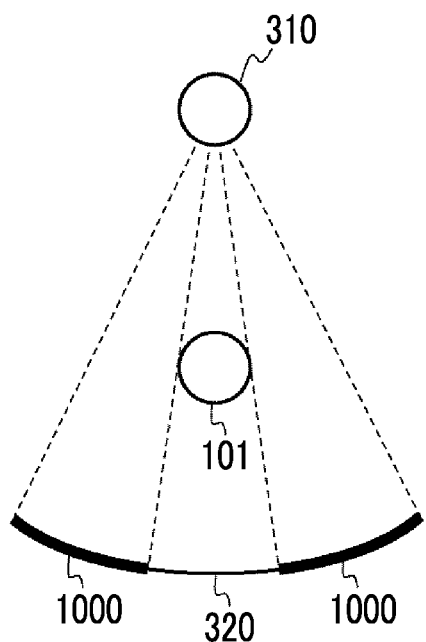
FIG. 10A-10D are diagrams showing a region in which presence or absence of an abnormality is determined during scanning of a subject.
Figure 10B:
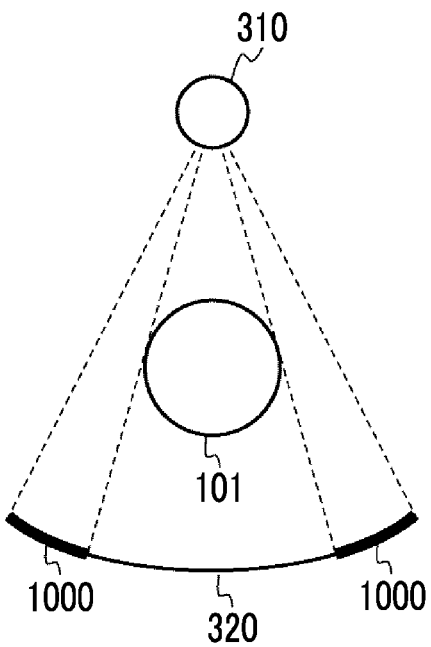
Figure 10C:
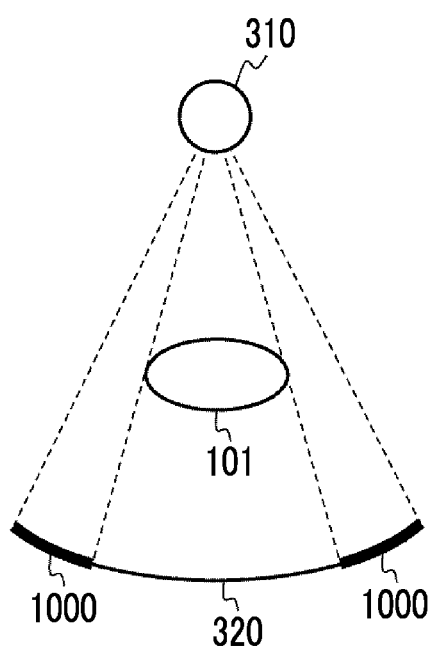
Figure 10D:
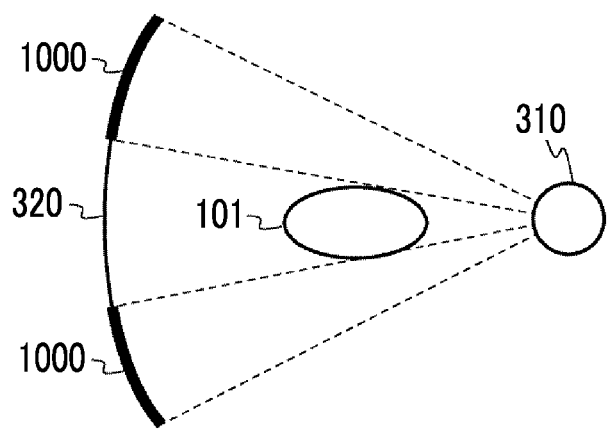

By the flow of the processing shown as an example in FIG. 9, the PCCT apparatus 100 can detect the abnormality occurring in the detection element 321 which is a photon counting type detector. In addition, following the screen displayed in a case where the polarization has occurred in the detection element 321, performing a power restart can resolve the polarization and reduce the downtime during the abnormality occurrence.

The general controller 400 executes S901 to function as a spectrum generation unit that generates a spectrum, which is the distribution of the photon counts for each energy bin. In addition, the general controller 400 executes S902 to function as a calculation unit that calculates the photon count change rate for each energy bin from the spectrum at the first time and the spectrum at the second time. Further, the general controller 400 executes S905 to function as a determination unit that determines the presence or absence of an abnormality in the photon counting type detector based on the photon count change rate.

EXAMPLE 2

In Example 1, it has been described that an abnormality occurring in the detection element is detected based on the temporal change of the spectrum generated by counting X-ray photons. The detection of the abnormality occurring in the detection element is not limited to Example 1. In Example 2, the detection of the abnormality occurring in the detection element will be described based on a difference between a spectrum obtained by a certain detection element and a spectrum obtained by another detection element at the same time. Since the overall configuration of the PCCT apparatus 100 is the same as that of Example 1, the description thereof will not be repeated.

Figure 13:
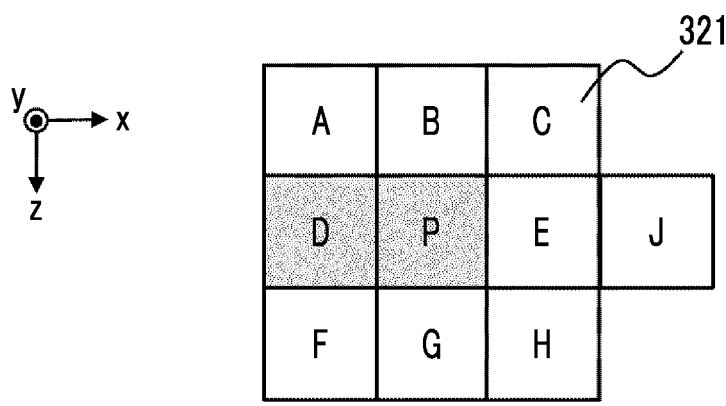
FIG. 13 is a diagram showing a difference in spectra in a case where an abnormality has occurred in one of adjacent detection elements.
Figure 13:
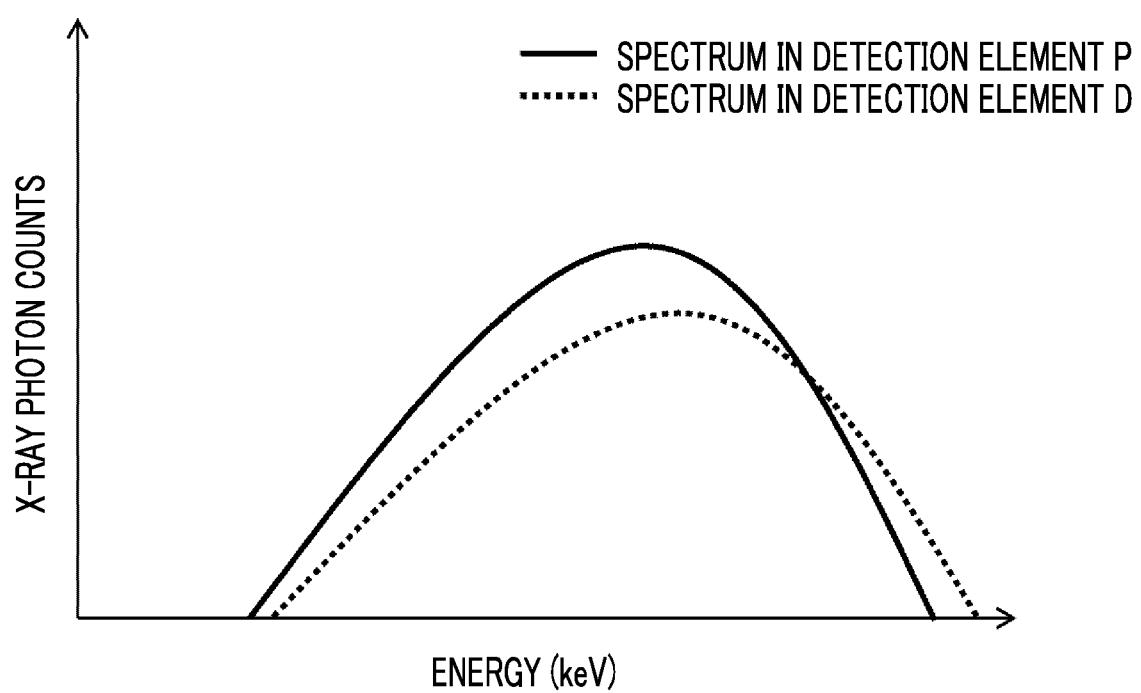

Example 2 will be described with reference to FIG. 13. In a case where both adjacent detection elements P and D are normal, there is no difference in the spectra of the two, whereas in a case where an abnormality has occurred in either one of them, a difference occurs in the spectra of the two as shown as an example in FIG. 13. That is, the abnormality that has occurred in the detection element can be detected based on the difference between a spectrum obtained by a certain detection element and a spectrum obtained by another detection element at the same time. More specifically, in a case where a difference D (ch, E) in X-ray photon counts calculated using Equation 2 exceeds a predetermined allowable range, determination is made that an abnormality has occurred in the detection element 321.

$$D(ch,E)=C(ch,E)-Ave(ch,E) \quad \text{(Equation 2)}$$

Here, ch denotes the channel number of the detection element 321, E denotes the energy bin, and C (ch, E) denotes the X-ray photon counts counted at the energy bin E for the detection element 321 of the channel number ch. Further, Ave (ch, E) denotes an average value of the X-ray photon counts counted at the energy bin E for the plurality of detection elements 321 close to the channel number ch. The detection elements 321 close to the channel number ch includes, for example, in a case where the detection element 321 of the channel number ch is the detection element P of FIG. 13, detection elements A to H located around the detection element P or the detection element J and the like adjacent to the detection elements A to H.

In addition, the abnormality cause of the detection element 321 may be estimated based on the difference pattern calculated by (Equation 2). That is, the determination of whether or not the pattern of the polarization is included and the estimation of the abnormality cause other than the polarization are performed in the same manner as in Example 1 by using the difference pattern instead of the temporal change pattern. In addition, in a case where the polarization has been detected, a screen for issuing an instruction of a power restart may be displayed in the same manner as in Example 1.

According to Example 2, the PCCT apparatus 100 can detect the abnormality occurring in the detection element 321 which is a photon counting type detector without relying on the temporal change in the spectrum. By not relying on the temporal change in the spectrum, it is not necessary to count X-ray photons in advance, and it is possible to save the storage capacity of the storage device 403. In addition, in the same manner as in Example 1, following the screen displayed in a case where the polarization has occurred in the detection element 321, performing a power restart can resolve the polarization and reduce the downtime during the abnormality occurrence.

Examples of the present invention have been described above. It should be noted that the present invention is not limited to the above-described examples, and the components can be modified and embodied without departing from the gist of the invention. In addition, a plurality of components disclosed in the above-described examples may be combined as appropriate. Further, some components may be deleted from all the components described in the above-described examples.

EXPLANATION OF REFERENCES

100: PCCT apparatus
101: subject
102: table
200: input and output unit
210: input device
220: monitor
300: imaging unit
310: X-ray source
311: collimator
320: X-ray detector
321: detection element
330: gantry
331: opening portion
332: rotating plate
340: imaging controller
341: X-ray controller
342: gantry controller
343: table controller
344: detector controller
400: general controller
401: CPU
402: memory
403: storage device
1000: air region measurement portion
1100: notification/instruction screen

What is claimed is:

1. A PCCT apparatus including a photon counting type detector that counts X-ray photons, the PCCT apparatus comprising:
   a spectrum generation unit configured to generate a spectrum that is a distribution of photon counts for each energy bin;
   a calculation unit configured to calculate a photon count change rate for each energy bin from a spectrum at a first time and a spectrum at a second time; and
   a determination unit configured to determine presence or absence of an abnormality in the photon counting type detector based on the photon count change rate.

2. The PCCT apparatus according to claim 1,
   wherein the determination unit is configured to estimate an abnormality cause of the photon counting type detector based on a pattern of the photon count change rate.

3. The PCCT apparatus according to claim 2,
   wherein the determination unit is configured to determine whether or not the abnormality that has occurred in the photon counting type detector includes polarization, based on the pattern.

4. The PCCT apparatus according to claim 3,
   wherein the determination unit is configured to display a screen for issuing an instruction of a restart in a case where it is determined that the abnormality that has occurred in the photon counting type detector includes the polarization.

5. The PCCT apparatus according to claim 3,
   wherein the determination unit is configured to determine that the abnormality that has occurred in the photon counting type detector includes the polarization, in a case where the photon count change rate for each energy bin is outside an allowable range, the photon count change rate outside the allowable range does not remain within a part of an energy region, there is one intersection point between the spectrum at the first time and the spectrum at the second time, and an energy region where photon counts are zero in the spectrum at the second time is less than half of an energy region in the spectrum at the first time.

6. The PCCT apparatus according to claim 1,
   wherein the determination unit is configured to, in a case where the number of detection elements whose photon count change rates for each energy bin are outside an allowable range is equal to or less than a predetermined threshold value, display a screen for issuing an instruction to register the detection element whose photon count change rate for each energy bin is outside the allowable range, as a defective channel.

7. The PCCT apparatus according to claim 1,
   wherein the determination unit is configured to determine that there is an abnormality in an X-ray source, in a case where the photon count change rate for each energy bin is outside an allowable range and all detection elements have the same pattern.

8. The PCCT apparatus according to claim 1,
   wherein the spectrum generation unit is configured to generate the spectrum for an X-ray in an air region that varies depending on a size of a subject and a projection angle.

9. The PCCT apparatus according to claim 1,
   wherein the determination unit is configured to use an allowable range that is set narrower as a distance from a center in a rotation direction of the photon counting type detector becomes shorter for the determination of the presence or absence of the abnormality.

10. A control method of a PCCT apparatus including a photon counting type detector that counts X-ray photons, the control method comprising:
    a spectrum generation step of generating a spectrum that is a distribution of photon counts for each energy bin;
    a calculation step of calculating a photon count change rate for each energy bin from a spectrum at a first time and a spectrum at a second time; and
    a determination step of determining presence or absence of an abnormality in the photon counting type detector based on the photon count change rate.

* * * * *